INVENTORS
GERALD H. OTTAWAY
HELMUT PAINKE
TITUS SCHELER
HELMUT WILL
WILLIAM V. WRIGHT

BY
Melvin P. Williams
ATTORNEY

Aug. 13, 1968 G. H. OTTAWAY ET AL 3,397,391

COMPACT STORAGE CONTROL APPARATUS

Filed Oct. 22, 1965 2 Sheets-Sheet 2

United States Patent Office 3,397,391

Patented Aug. 13, 1968

3,397,391

COMPACT STORAGE CONTROL APPARATUS

Gerald H. Ottaway, Hyde Park, N.Y., and Helmut Painke, Sindelfingen, Titus Scheler, Boblingen, and Helmut Will, Sindelfingen, Germany, and William V. Wright, Poughkeepsie, N.Y., assignors to International Business Machines Corporation, Armonk, N.Y., a corporation of New York Filed Oct. 22, 1965, Ser. No. 502,196
7 Claims. (Cl. 340—172.5)

ABSTRACT OF THE DISCLOSURE

Disclosed is a microprogram control for a data processing system wherein microprogram control words are stored in a read only store and wherein those words are read out to control the operation of the system. The particular word read out is selected by an address register which specifies a particular word in the read only store. Each word establishes a particular set for control conditions throughout the system. Each word contains a plurality of portions where only one of those plurality is gated to a read only store output register during one cycle. The selection of which portion will be gated to the output register is under control of a decoder which decodes data manifestations applied to the address register from the output register. One of the portions may include N fewer data manifestations than the other portions, in which case, N data manifestations saved from a portion gated during a previous cycle are combined with that portion and together they are applied to the address register. By saving the N data manifestations from cycle to cycle, redundant data locations in the read only store are eliminated thereby reducing the overall size of the read only store.

Figure 1:
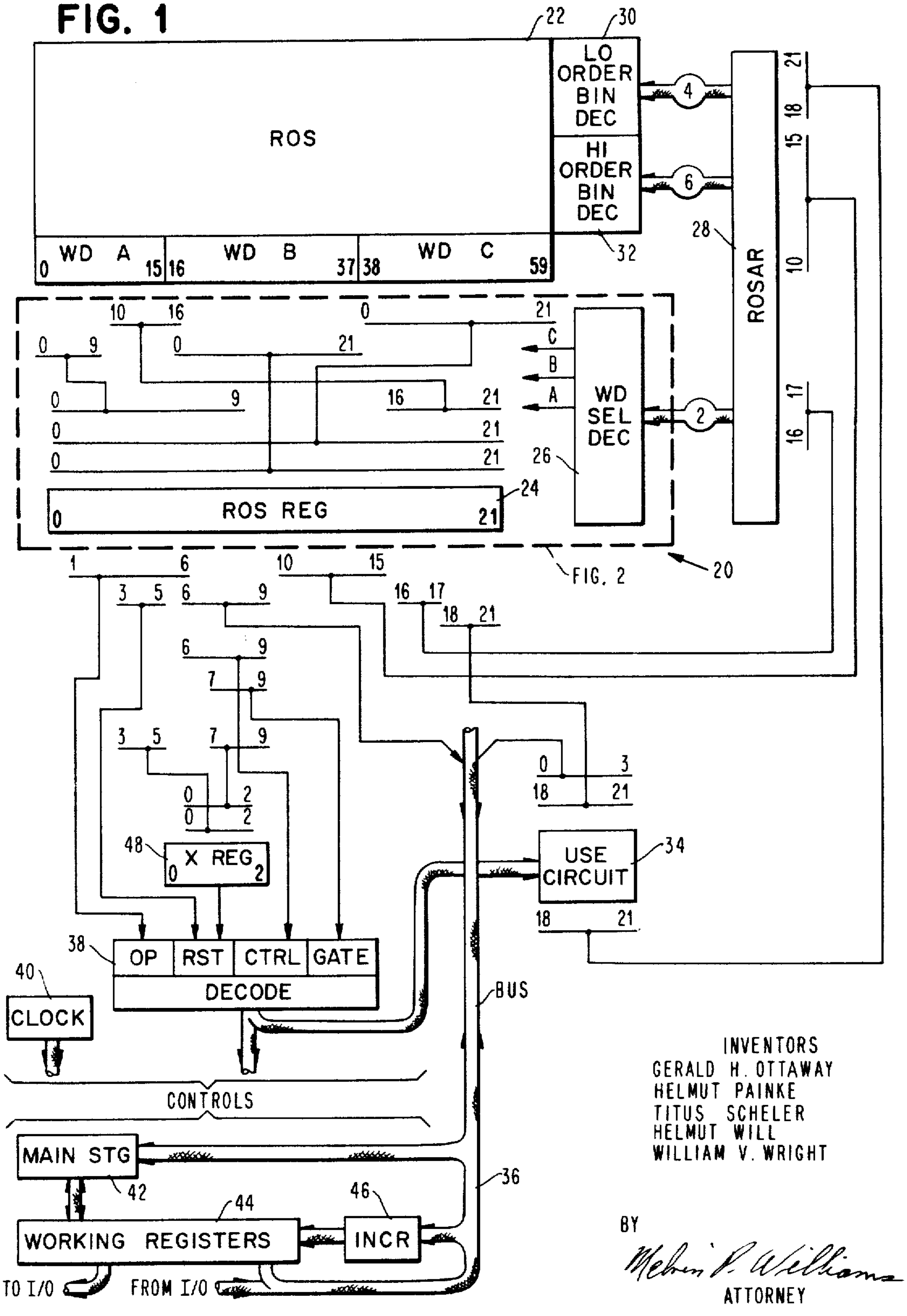

This invention relates to data processing, and more particularly to apparatus for reducing the number of storage positions required in a storage apparatus of the self-addressing type.

In the data processing art, a variety of types of storage devices are available. Certain of these devices are utilized in such a manner that each storage word which is read includes at least a part of an address to be utilized in accessing a succeeding storage word. This is particularly true in storage devices which are utilized directly to store a program comprising a sequence of instructions. Thus, some of the earlier computers had, as a portion of each instruction, the address of the next succeeding instruction; a computer of this type is disclosed in U.S. Patent No. 2,959,351, Data Storage and Processing Machine, filed by F. E. Hamilton et al. on Nov. 2, 1955, and issued to this assignee on Nov. 8, 1960. Some of the more modern computers utilize sequences of microprogram steps to effect serial operations which result in the performance of primary, or macro instruction steps; a computer of this type is shown in a copending application of the same assignee entitled, Data Processing System, Ser. No. 357,372, filed on Apr. 6, 1964, by G. M. Amdahl et al. In either case, the storage device may be a normal storage device having reading and writing capabilities, or may be what is commonly known as a read-only storage device (ROS). A ROS is not capable of having information stored therein in a dynamic fashion, but rather has its information stored in the nature of its construction; thus, a ROS may be thought of as simply a decoder wherein the address is a manifestation in a first code, and a storage word which is read therefrom is in fact a manifestation of a second code, the second code providing at least a portion of a third manifestation which comprises a subsequent input word in said first code (i.e., an address of still another storage word).

In any of the above examples (macro instructions or micro instructions, ordinary storage or read only storage), it is advantageous to effect maximum utility with a minimum amount of storage equipment. In such cases, where each storage word includes as a portion thereof at least a portion of the address of the next succeeding storage word, it is possible to effect a reduction in storage size due to the fact that a sequence of storage words may be located within a common portion having the addresses relating to this common area of memory would have identical high-order address bits. Therefore, as each storage word in a group is read out and analyzed for the address of the next sequential storage word, the high-order address bits can be saved for use in helping to define the address of the next sequential word.

A read only storage system used for microprogram control of a data processing system of this type is illustrated in a related copending application of the same assignee entitled "Addressing Control System," Ser. No. 415,998, filed on Dec. 4, 1964 by Thomas Ragland. In the system of said related copending application, each bit of a storage word being read from a read only storage which is *not* utilized as an addressing bit is given significance in the operational or control portion of the micro instruction, or is utilized to designate a register involved with the micro instruction. Thus, a simple branch instruction has a short operational portion and a maximum read only storage address portion, whereas a three-register fetch instruction has a very short ROS next-address portion but has a large portion allocated to identifying the registers involved in the fetch operation. This system has a somewhat limited drawback in that a rather complex operational decoder and address decoder combination is required, and a further problem resides in the fact that operands of certain types can be followed only by those instructions found within the same general area of storage (not requiring high-order address bits in the next-instruction designation).

Therefore, the primary object of the invention is to provide a compact self-addressed storage system.

Other objects of the invention include the following:

Provision of an improved self-addressed storage system;

Provision of an improved means for reducing the size of a control storage addressing apparatus; and Provision of an economical control storage apparatus.

In accordance with the present invention, the storage word which is read out from storage upon an access thereof is divided into three sub-words (herein referred to, for example, as instruction words), any one of which may be selected in dependence upon the particular configuration of a small group of bits in the storage address. These instruction words are of different sizes so as to permit storage words of a great enough length to provide a maximum number of required next-address bits, while providing storage words of a smaller size which utilizes a minimum number of next-address bits although providing full operational capabilities. In a particular embodiment of the present invention, a read only storage is used for controlling a data processing system, and it presents a storage word of 60 bits, 44 bits of which are arranged in two words of 22 bits each, and one word of which contains 16 bits. Address bits used to select a particular one of the instruction words within the storage word are included within the next-address bits in all of the words, including the 16-bit words. Thus, on each successive accessing of storage, full control over the selecting of one of the different words is maintained without regard to whether a 16-bit or a 22-bit word has currently been chosen. As in said related copending application, high-order next-address bits which are not provided in any cycle are saved from the preceding cycle, through as many iterations (or cycles) as necessary. This is accomplished directly under control of the bit combination which selects 16-bit or 22-bit words, since this control also governs the resetting of the high-order next-address portion of the storage output register.

The invention permits a reduction in the number of bits required in a control storage apparatus, without requiring different formats for different operations, and without limiting the number of next-address combinations which are available, in any current instruction, on the basis of the particular operation involved in the current instruction. Thus, a saving in control storage is provided merely through the economic use of address bits themselves.

Other objects, features and advantages of the present invention will become more apparent in the light of the following description of a preferred embodiment thereof, as illustrated in the accompanying drawing.

Figure 2:
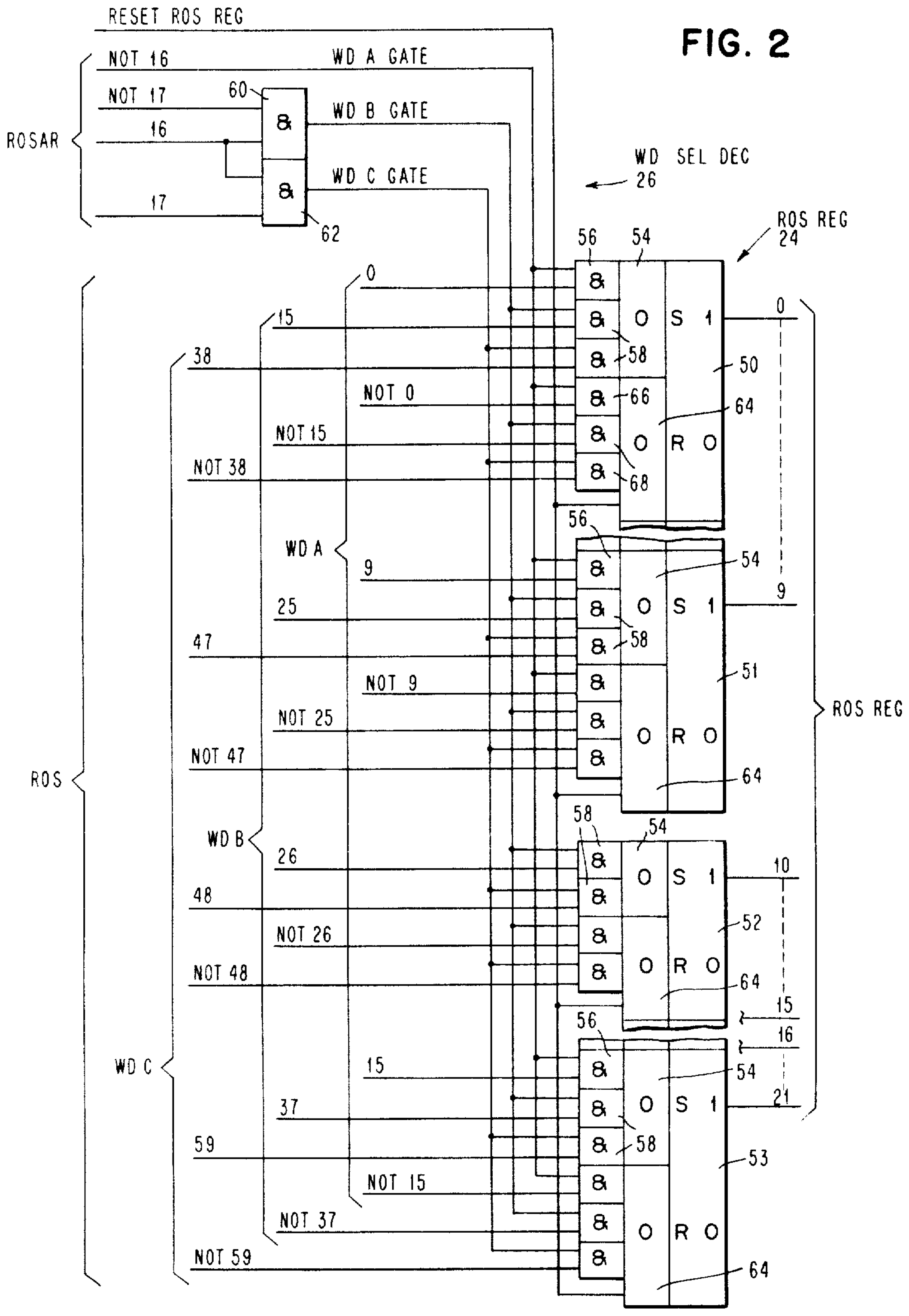

In the drawing:

FIG. 1 is a schematic block diagram of a control storage apparatus utilizing the address economies of the present invention; and FIG. 2 is a partially broken-away schematic block diagram of an exemplary ROS register for use in the embodiment of FIG. 1.

Referring now to FIG. 1, a control storage apparatus 20 includes a read only storage unit (ROS) 22, an output data register for the read only storage unit, which is called the ROS REG 24, and a word select decoder (WD SEL DEC) 26, for controlling the selection of one of the instruction words (WD A, WD B, WD C) from the ROS storage word. The control storage apparatus 20 also includes the input address register or ROS address register (ROSAR) 28 and the low order and high order binary decoders 30, 32 which decode the address bits for application directly to the ROS circuits.

The output of the ROS REG 24 is divided so that different bit combinations thereof can be applied to different circuitry. For instance, bits 10–17 are applied directly to corresponding bit positions of the ROSAR 28. These comprise the high order address bits (10–15) of the next-instruction address, and the word selecting bits (16, 17) of the next-instruction address. The low order bits of the next-instruction address (18–21) are applied from the ROS REG 24 to a USE circuit 34. The USE circuit is not germaine to the invention herein and is described and claimed in a copending application of the same assignee entitled, Micro Program Control for a Data Processing System, Ser. No. 502,195, filed Oct. 22, 1965, by W. V. Wright et al. These bits may be combined in the USE circuit 34 with a like number of bits from the computer's main BUS in response to particular instructions, or may be passed without change to the low order bit positions of the ROSAR 28.

Bits 0–9 of the ROS REG 24 are applied in various combinations to different parts of a DECODE circuit 38 for providing operational decoding (OP), and register controls, including a control (RST) for resetting and then setting the working registers, a control (CTRL) for selecting different input/output unit functions, and a control (GATE) for gating out data from selected ones of the working registers onto a BUS. The RST portion of the decoder is provided with a buffer register, the X REG 48 so as to permit controlling the working registers very late in a cycle; this is incidental to the present invention. The output of the DECODE circuit 38, together with clocking control from a CLOCK circuit 40 is applied to various parts of the computer, including a MAIN STORAGE 42, WORKING REGISTERS 44, and an incrementer (INCR) 46, as well as to other incidental parts that are not shown in FIG. 1. It should be borne in mind that the nature of the computer is immaterial to the present invention, the circuits 42, 44 and 46 being illustrative merely of main portions of a computer data flow which might be found in a computer utilizing the present invention. Specifically, the invention herein relates to the various word sizes in a storage control apparatus such as the one shown in FIG. 1.

In operation, each micro-instruction cycle provides a storage word from ROS 22, the storage word including three instruction words (WD A, WD B, and WD C), one of which is selected by the word select decode (WD SEL DEC) 26 so as to apply either 22 bits or 16 bits to the ROS REG 24. The details of the WD SEL DEC 26 are shown with the ROS REG 24 in FIG. 2. Whenever the 16-bit word is selected (WD A), bits 10–15 of the ROS REG 24 remain unchanged; the word selection feature is the heart of the invention herein. The next succeeding cycle locates a storage word in ROS 22 in dependence upon the setting of bits 10–21, and in dependence, also, upon bits 0–3 of the BUS 36, whenever one of the USE instructions is involved. Thus, each cycle defines, at least in part, the address for the next cycle. Each cycle also provides operational bits (1–9) for controlling the remainder of the computer (42, 44, 46).

Suitable timing controls (not shown herein) for the ROSAR and the ROS REG would be provided to suit any particular implementation, in accordance with principles well known in the data processing art.

Restating the invention herein, the apparatus of FIG. 1 has the ability to select between WD A, WD B and WD C, wherein WD A is only 16 bits long, the remaining six bits required for a full 22 bit instruction word being saved from a preceding storage word. Selecting between WD A, WD B and WD C is acomplished by the word select decode circuit (WD SEL DEC) 26 in response to bits 16 and 17 of the ROS register, which bits are supplied by each of the words (A, B and C) which the ROS presents. Thus, the words are selected by address bits which appear in each of the words, so that whenever the short word (WD A) is selected, it nonetheless has the ability to itself select another short word (WD A) or one of the larger words (WD B, WD C). In this fashion, a very simple yet effective method of reducing the size of a storage apparatus is provided.

In this particular embodiment, there are 1024 addressable storage words, each containing WD A, WD B, and WD C. Since each of these words has six fewer bits than it would otherwise have (due to the fact that WD A is only 16 bits long instead of 22 bits long), 6,000 bits of storage (more or less) are saved of a possible 60,000 bits. In other words, there is a ten percent saving in the bit configuration shown herein. Of course, if WD B were also made 16 bits long, so that full addressing could only be achieved by WD C, a 20 percent saving could be effected but only at the expense of more restrictions on the microprogram. Inasmuch as selecting one of a plurality of words presented by a storage device is a well known addressing technique, the 10 percent saving herein is achieved at virtually no additional cost.

Referring now to FIG. 2, the ROS REG 24 comprises a plurality of latches 50–53, there being one latch for each bit of the register. Each of the latches is settable in response to bits selected from the storage word of ROS. The latches 50, 51 and 53 correspond to bits 0–9, and 16–21, and are settable by related bits from any one of the storage words (WD A, WD B, WD C) whereas the latch 52 (which corresponds to bits 10–15) is settable only by words B and C. Each of the latches 50–53 is settable by a related OR circuit 54 in response to corresponding AND circuits 56, 58. The AND circuits 58 correspond to related bits of WD B or WD C, whereas the AND circuits 56 relate to WD A. Thus it is seen that when any one of the words is selected, it will set a combination of latches on a bit-by-bit basis.

Selecting from among WD A, WD B and WD C is achieved under the control of signals on WD A GATE, WD B GATE, and WD C GATE lines. These lines are energized in response to specific combinations of bits 16 and 17 of the ROSAR. If there is no bit 16 present, there will automatically be a signal to select WD A; if bits 16 and 17 are both present, then an AND circuit 62 will generate a signal which selects WD C; if bit 16 is present but bit 17 is absent, then an AND circuit 60 will select WD B.

When any word is selected, the related AND circuits 56, 58 will cause the corresponding OR circuit 54 to set the related latch 50–53 only when there is a bit signal apparent on a bit line (such as bit 15 of WDB). Whenever there is no signal present on the bit line, then there must, by definition, be a signal on the complement of that line (such as NOT 15 in WDB). In order to guarantee, whenever there is no bit present, that the latches 50–53 reflect that fact, the latches 50–53 are resettable by OR circuits 64 in response to a general reset signal (which is included herein for illustrative purposes only) or in response to a plurality of related AND circuits 66, 68. For each AND circuit 56 there is a related AND circuit 66; for each AND circuit 58 there is a related AND circuit 68. Thus, either the OR circuit 54 or the OR circuit 64 must be operated for one of the AND circuits 56, 58, 66, 68, in dependence upon whether the signal or the complement of the signal is present (15 or NOT 15, for example) for the related selected word. The signal on a RESET ROS REG line might be generated by any timing or control function in the system, it being shown here for purposes of illustration only, there being no requirement that the ROS REG be completely reset other than by new data as new data is selected by the word select decoder 26.

Thus, there has been described a control for a data processing system which includes the ability to select words of different sizes from a ROS, the ability to select any one of the words not being impaired by the particular word which is, or has been selected. Stated alternatively, the invention achieves a saving in storage word size, or in decoder size (if a ROS is considered to be a decoder) by having each address (or input code) cause the presentation of a related set of words (or decoder results), the address then selecting one of them; the portion of the address (or input) which does the selecting appearing as a portion of any selected word (or result), some portion of a word (or result) relating to the selection of the next word (or result) being omitted in some of the selected words (or results). The omitted portion (i.e., bits 10–15 of WDA herein) are supplied by the ROS REG (in this embodiment), having been saved from a preceding storage word; however, these bits (i.e., 10–15) could just as well be saved in the ROSAR in any given case.

While the invention has been shown and described with respect to a particular embodiment thereof; it should be apparent to those skilled in the art that various changes and omissions in the form and detail thereof may be made therein without departing from the spirit and the scope of the invention, which is to be limited only as set forth in the following claims.

What is claimed is:

1. In a storage apparatus including a storage device, a storage output register, and a storage input address register, said storage device responsive to at least a first part of the contents of said storage input address register for presenting a storage word, the combination comprising:

means responsive to a second part of the contents of said storage input address register for selecting one of a plurality of portions of said storage word for application to said storage output register, at least one of said selectable portions comprising fewer manifestations than at least one other of said portions, said fewer manifestations including manifestations corresponding to said second part;

and means for transferring a portion of the contents of said storage output register to said storage input address register.

2. A storage apparatus including a storage device, a storage output register, and a storage input address register having at least first and second parts, said storage device responsive to at least said first part for presenting a storage word having an A portion and a B portion where said A portion includes N fewer data manifestations than said B portion, said apparatus characterized by:

means responsive to said second part of said address register for selecting, as a function of the contents of said second part, said A or said B portion as the selected portion of said storage word for application to said output register;

first means for transferring a first section including a first portion of said selected portion from said output register to said address register first part; and second means for transferring a second portion of the contents of said output register to said address register second part.

3. The storage apparatus of claim 2 wherein said storage device presents a storage word during each storage device cycle, wherein said selected portion is applied to said output register during each storage device cycle, and where:

said output register includes N positions for retaining data manifestations unaltered during a plurality of storage device cycles in which said A portion is the selected portion; and said first section includes data manifestations from said N positions.

4. A storage apparatus including a storage device, a storage output register, and a storage input address register having at least first and second parts, said storage device responsive to at least said first part for presenting a storage word during each storage device cycle, said storage word having an A portion and a B portion where said A portion includes N fewer data manifestations than said B portion, said apparatus characterized by:

selecting means responsive to the contents of said second part of said address register for selecting said B portion, during an initial storage device cycle, and said A or said B portion, during a subsequent storage device cycle, said selecting means thereby gating said A or said B portion as the selected portion of said storage word to said output register;

first means for transferring a first section including a first portion of said selected portion from said output register to said address register first part; said first means including means for transferring, to said first part, N data manifestations from a B portion gated to said output register during one cycle when said A portion is the selected portion gated during a subsequent cycle; and second means for transferring a second portion of the contents of said output register to said address register second part.

5. The storage apparatus of claim 4 wherein said storage word includes a C portion having the same number of data manifestations as said B portion and where:

said selecting means includes a decoder for decoding the contents of said second part thereby selecting said A, B or C portion as the selected portion; and said first means is operative to transfer N data manifestation from the last selected B or C portion, during a subsequent cycle when the A portion is the selected portion, as controlled by said selecting means.

6. The apparatus of claim 5 further including:

a decoder; and means for transferring a third portion of said selected portion to said decoder whereby said decoder decodes control signals for a data processing system.

7. A storage apparatus including a storage device, a storage output register, and a storage input address register having at least first and second parts, said storage device responsive to at least said first part for presenting a storage word having a plurality of portions, said apparatus characterized by:

means responsive to said second part of said address register for selecting, as a function of the contents of said second part, any one of the plurality of portions of said storage word for application to said output register;

transferring means for transferring a portion of the contents of said storage output register to said address register first part; said transferring means including means for transferring a portion of the contents of said output register to said address register second part.

References Cited

UNITED STATES PATENTS

| | | | |
|---|---|---|---|
| 3,166,668 | 1/1965 | Marsh | 340—172.5 |
| 3,208,047 | 9/1965 | Ridler | 340—172.5 |
| 3,251,037 | 5/1966 | Coil et al. | 340—172.5 |
| 3,284,778 | 11/1966 | Trauboth | 340—172.5 |
| 3,316,538 | 4/1967 | Piloty et al. | 340—172.5 |

PAUL J. HENON, *Primary Examiner.*